US011531932B2

(12) United States Patent
Alakuijala et al.

(10) Patent No.: US 11,531,932 B2
(45) Date of Patent: Dec. 20, 2022

(54) SYSTEMS AND METHODS FOR COMPRESSION AND DISTRIBUTION OF MACHINE LEARNING MODELS

(71) Applicant: Google LLC, Mountain View, CA (US)

(72) Inventors: Jyrki Alakuijala, Wollerau (CH); Robert Obryk, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 570 days.

(21) Appl. No.: 16/624,497

(22) PCT Filed: Jul. 6, 2017

(86) PCT No.: PCT/US2017/040798
§ 371 (c)(1),
(2) Date: Dec. 19, 2019

(87) PCT Pub. No.: WO2019/009897
PCT Pub. Date: Jan. 10, 2019

(65) Prior Publication Data
US 2021/0027195 A1    Jan. 28, 2021

(51) Int. Cl.
G06N 20/00    (2019.01)
G06N 3/04    (2006.01)
G06N 3/08    (2006.01)

(52) U.S. Cl.
CPC .............. *G06N 20/00* (2019.01); *G06N 3/04* (2013.01); *G06N 3/084* (2013.01)

(58) Field of Classification Search
CPC ........... G06N 20/00; G06N 3/084; G06N 3/04
USPC ........................................................ 706/12
See application file for complete search history.

(56) References Cited

U.S. PATENT DOCUMENTS

2015/0324690 A1    11/2015   Chilimbi et al.
2016/0328647 A1*   11/2016   Lin .................. G06F 17/11

FOREIGN PATENT DOCUMENTS

WO    WO 2016/037351    3/2016
WO    WO 2016/039651    3/2016

OTHER PUBLICATIONS

Dong et al, "Learning Accurate Low-Bit Deep Neural Networks with Stochastic Quantization", arXiv:1708v1, Aug. 3, 2017, 12 pages.
Hou et al, "Loss-Aware Binarization of Deep Networks", arXiv:1611v3, May 10, 2018, 11 pages.

(Continued)

*Primary Examiner* — John Q Chavis
(74) *Attorney, Agent, or Firm* — Dority & Manning, P.A.

(57) ABSTRACT

The present disclosure provides systems and methods for compressing and/or distributing machine learning models. In one example, a computer-implemented method is provided to compress machine-learned models, which includes obtaining, by one or more computing devices, a machine-learned model. The method includes selecting, by the one or more computing devices, a weight to be quantized and quantizing, by the one or more computing devices, the weight. The method includes propagating, by the one or more computing devices, at least a part of a quantization error to one or more non-quantized weights and quantizing, by the one or more computing devices, one or more of the non-quantized weights. The method includes providing, by the one or more computing devices, a quantized machine-learned model.

20 Claims, 5 Drawing Sheets

(56) References Cited

OTHER PUBLICATIONS

International Search Report for PCT/US2017/040798 dated Mar. 14, 2018, 3 pages.
Zhou et al, "Incremental Network Quantization: Towards Lossless CNNs with Low-Precision Weights", arXiv:1702v2, Aug. 25, 2017, 14 pages.

* cited by examiner

SYSTEMS AND METHODS FOR COMPRESSION AND DISTRIBUTION OF MACHINE LEARNING MODELS

PRIORITY CLAIM

This application is based upon and claims the right of priority under 35 U.S.C. § 371 to International Application No. PCT/US2017/040798 filed on Jul. 6, 2017, which is incorporated by reference herein.

FIELD

The present disclosure relates generally to machine learning models. More particularly, the present disclosure relates to leveraging compression in the distribution of machine learning models.

BACKGROUND

Machine learning models can help in solving a variety of tasks that have traditionally been difficult for a computing system. However, the machine learning models are often large and require a considerable amount of storage capacity and transfer bandwidth to be delivered to a computing system. As such, to make machine learning models more appealing for application in bandwidth-limited networks, for example in mobile applications and the like, ways are needed to reduce the cost of transfer and storage of machine learning models.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method to compress machine-learned models. The method can include obtaining, by one or more computing devices, a machine-learned model. The method can further include selecting, by the one or more computing devices, a weight to be quantized. The method can further include quantizing, by the one or more computing devices, the weight. The method can further include propagating, by the one or more computing devices, at least a part of a quantization error to one or more non-quantized weights. The method can further include quantizing, by the one or more computing devices, one or more of the non-quantized weights. The method can further include providing, by the one or more computing devices, a quantized machine-learned model.

In some embodiments, the method can additionally include where propagating the quantization error includes determining, by the one or more computing devices, the quantization error. Propagating the quantization error can further include determining, by the one or more computing devices, one or more non-quantized weights associated with the weight. Propagating the quantization error can further include allocating, by the one or more computing devices, a fractional part of the quantization error to each of the associated non-quantized weights.

Another example aspect of the present disclosure is directed to a computing device. The computing device includes one or more processors; and one or more non-transitory computer-readable media that store instructions that, when executed by the one or more processors, cause the computing device to perform operations. Execution of the instructions causes the computing device to obtain a machine-learned model. Execution of the instructions further causes the computing device to select a weight to be quantized. Execution of the instructions further causes the computing device to quantize the weight. Execution of the instructions further causes the computing device to propagate at least a part of a quantization error to one or more non-quantized weights. Execution of the instructions further causes the computing device to quantize one or more of the non-quantized weights. Execution of the instructions further causes the computing device to provide a quantized machine-learned model.

Another example aspect of the present disclosure is directed to one or more non-transitory computer-readable media that store instructions that, when executed by one or more processors of a computing system, cause the computing system to perform operations. Execution of instructions causes the computing system to obtain a machine-learned model. Execution of instructions causes the computing system to, for one or more weights of the machine-learned model, select a weight to be quantized and quantize the weight. Execution of instructions further causes the computing system to propagate at least a part of a quantization error to one or more non-quantized weights. Execution of instructions further causes the computing system to provide a quantized machine-learned model.

Other example aspects of the present disclosure are directed to systems, apparatus, tangible, non-transitory computer-readable media, user interfaces, memory devices, and electronic devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods to compress and/or distribute machine-learning models. In particular, the systems and methods of the present disclosure can leverage compression methods to reduce the size (e.g., the data storage and transfer requirements) of a machine-learned model. By reducing the size of the model, the systems and methods of the present disclosure can reduce the network and/or computational expense associated with transfer, storage, and/or use of the model. In particular, enabling reduced network expenses associated with transfer or other forms of distribution of the machine-learned models can make the machine-learned models more appealing or useful in limited-bandwidth networks. Likewise, enabling reduced storage expense and/or computational expense associated with storage and/or use of the machine-learned models can make the machine-learned models more appealing or useful in resource-limited devices or environments such as, for example, mobile applications, devices, and/or environments.

Thus, the present disclosure provides compression techniques that can be used to reduce the size of machine-learned models. In particular, the systems and methods of the present disclosure can perform various types of quantization of weights of a model with loss management. As one example, the systems and methods of the present disclosure can provide model compression such that the distortion introduced by compression has a bounded increase in loss. As another example, in some implementations, when model weights are quantized, the quantization errors can be compensated by later quantization errors. For example, quantization error can be distributed among one model layer to the previous or next layer, among nodes within a layer, within connections of a single node, based on node correlation, and/or according to other schemes. As another example, an iterative training process can be performed in which a certain number of the best matching (e.g., lowest quantization error producing) nodes are quantized and then frozen while the model is subjected to additional training. By implementing quantization with loss management, as described herein, machine-learned models can be compressed more densely while reducing the fitness degradation of the machine-learned model.

In addition to compression techniques, the present disclosure provides additional techniques for improved distribution, storage, and/or use of machine-learned models. For example, in some implementations, the systems and methods of the present disclosure can perform or enable one or more of: patching for model updates, distributed learning, training for quantization, training for patching, and/or transfer learning. As an example, in some implementations, machine-learned model distribution can include patching where a smaller part (e.g., only a portion) of the machine-learned model is delivered to update a deployed version of the machine-learned model, such as on a mobile device, rather than updating the entire machine-learned model. In another example, in some implementations, distributed learning can be performed in which machine-learned model weights are changed at a client device and are then gathered through patches from the client device. The use of patches for uploading of updated weights from the client device reduces the bandwidth used by the client device.

In yet another example, in some implementations, the systems and methods of the present disclosure can perform or enable training for quantization, in which certain weights of a model are selected and frozen during training to improve error, and training for patching, in which whole layers of a model are selected and frozen during training to improve compression. In another example, in some implementations, machine-learned model distribution can include transfer learning in which patching can be used to repurpose a model already existing on a client device, thereby eliminating the need to transmit an entirely new model.

More particularly, according to one aspect of the present disclosure, machine-learned model distribution can include compressing machine-learned models by implementing quantization with loss management. Using quantization with loss management, a machine-learned model can be compressed for distribution by quantizing model weights where quantization errors can be compensated by other quantization errors. In some implementations, for example, quantization error can be compensated for by dithering to distribute the quantization error among other associated weights. When a neural weight is quantized, some error is introduced which can then be distributed among weights that have yet to be quantized to compensate for the error. For example, when a weight is quantized, a determination can be made of which other weights (that have yet to be quantized) are associated with the quantized weight. The quantized weight's quantization error can then be fractionally distributed to those associated weights, for example, by using a predetermined multiplier. The next associated weight then takes its original value plus the transferred quantization error, and that new weight value is then quantized. The quantization error from the quantization of this next associated weight can then be distributed among the remaining associated weights that have not yet been quantized.

In some implementations, as the quantization of the weights continues, the quantization error can accumulate until reaching or exceeding a threshold which can then cause an opposite error to be made and thereby reduce the error in the remaining weight values. In some implementations, quantization decisions are not made one at a time, but instead consider the impact on other quantization decisions.

Accordingly, quantization with loss management can include various strategies to reduce the fitness degradation of the model. In some implementations, for example, quantization of weights can be performed based on a best-matching coefficient. For example, the quantization begins by determining the best matching coefficient (e.g., the weight that would result in the least amount of quantization error), and quantizing this weight. The quantization error from this weight can then be transferred to the other weights. By quantizing the best matching weight first, the transfer of the quantization error causes the worse matching weights to move and, no matter the direction of the move, these weights then have a higher probability of becoming better matching weights than if they were quantized in another order.

In some implementations, one or more of the best matching coefficients are quantized and then additional training iterations are completed while keeping the quantized coefficients locked. This can allow the first quantization errors to propagate to coefficients that are more difficult to quantize, allowing less overall error to be done in the quantization process. In some implementations, sets of best matching weights can be done simultaneously for faster computation, for example, the best matching 10% of weights or the like.

In some implementations, for example, quantization error can be dithered from the previous layer. For example, a distance measure can be used between nodes within a layer, and signals coming from the nodes of a previous cell can be quantized with consideration (e.g., partial accumulation) of the quantization error from similar nodes. As one example, node K1 and node K2 of layer K may have a similar connection to a previous layer J. As such, if the J1-to-K1 connection is quantized down, the J1-to-K2 connection can be enforced to be more likely to be quantized up.

In some implementations, the quantization error can be dithered within the node. For example, if a J1-to-K1 connection is quantized down, a J2-to-K1 connection can be enforced to be more likely to be quantized up.

In some implementations, the quantization error can be dithered within the node considering the correlation of activity, where the correlation of activity between two weights is descriptive of an activation relationship between the two weights. One goal for such correlation-based distribution scheme is that when the quantization error is dithered to a highly correlated node, the loss is decreased. By way of example, if a J1-to-K1 connection is quantized down, a J2-to-K1 connection should be more likely to be quantized as a function of the correlation between J1 and J2. In some implementations, if there is an inverse correlation, the dithering may be done in the opposite direction, potentially leading to a smaller error.

According to another aspect of the present disclosure, in some implementations, machine-learned model distribution can include patching where a smaller part of the machine-learned model is updated and delivered for changing a deployed version of the machine-learned model. For example, patching can provide for a part of a machine-learned model to be delivered (for example, to a mobile device or the like) without updating other parts of the machine-learned model. For example, patching can be used to deliver changes which are critical that they be delivered quickly to a large group of recipients. In some implementations, patching provides for updating smaller parts of a machine-learned model that is deployed, for example, in mobile devices, and how those smaller parts of the model go through the learning process of neural network computation. Patching can allow for updates that only concern a small subset of the neural graph so that they can be updated in such a way compress the size of the update. For example, to develop a smaller patch, the part of the neural network structure where training is allowed could be limited such that training only happens with a small subset of the weights. By way of example, in some implementations, training could be done with new weights being found. It can then be determined where the weights have changed the most, and another round of training could be done where only a subset of the weights, for example, the top five percentile of changed weights, are allowed to change. This would then result in a smaller number of weights changing, thereby creating a smaller patch. In another example, to develop a smaller patch, the neural network can be retrained and then a set of nodes whose values changed the most, for example the top five percentile of the changed weights (e.g., nodes with top five percent of ||retrained value−original value||), can be identified and included in the patch.

In some implementations, patching can include patches for a rule-based system verifying the results of a deep learning model. For example, when some situation calls for an immediate change to a model but a high-bandwidth update cannot be delivered to many users, patches could be used to check final results of text-based models or zero out parts of a machine-learned model. In some implementations, patching can include using previous weights to give a statistical prior for new weights, allowing for tighter compression of the new weights.

According to another aspect of the present disclosure, in some implementations, machine-learned model distribution can include distributed learning in which machine-learned model weights may be changed at a client device and are then gathered through patches from the client device to reduce the device bandwidth use. For example, in some implementations, machine-learned model weights may be changed at a client device to further optimize the model loss function with real data. In some implementations, the changed weights could then be gathered in "reverse" patches to minimize the client device bandwidth use. In some implementations, distributed learning using client data can be applied in such a way that a smaller set of node weights is chosen, for example, partly randomly (e.g., to improve privacy and coverage) and partly by what a central controller has seen as nodes worth updating (e.g., to improve efficiency).

According to another aspect of the present disclosure, in some implementations, machine-learned model distribution can include training for quantization and training for patching. For example, training for quantization can include determining weights to freeze during training to improve error. In some implementations, for example, an annealing process can be applied to weights by freezing a set of weights that introduce the smallest error. Training for patching can include, for example, choosing which layers to freeze during training. For example, in some models, the lower layers may typically remain unchanged whereas higher layers exhibit more change. In some implementations, this can be made explicit during a training phase, such as by adding rules into learning to freeze layers (e.g., either stochastically or by another measure of fitness impact), to produce smaller patch sizes.

According to another aspect of the present disclosure, in some implementations, machine-learned model distribution can include transfer learning whereby patching can benefit from an already learned model on a client device. For example, it can sometimes be beneficial to start training of a model from an already learned model. In some implementations, a patch approach can be applied for developing such models, thereby benefiting from an already deployed learned model such that an entire model does not need to be transferred, for example, providing for transfer of only small deltas.

The systems and methods described herein provide a number of technical effects and benefits. For instance, the use of learned-model distribution strategies such as quantization with loss management leads to reductions in bandwidth use which is a significant cost to mobile computing. Thus the systems and methods described herein allow for increased use of machine learned-models in bandwidth-limited networks, such as mobile computing, where the machine learned-models can provide benefits to a variety of user applications. Additionally, the systems and methods described herein may also provide a technical effect and benefit of reducing update size and improving performance due to reducing cache and memory bandwidth requirements.

The systems and methods described herein also provide resulting improvements to computing technology tasked with the distribution and use of machine-learned models. For example, through the use of advanced compression techniques for machine-learned model distribution as described herein, computing systems may optimize bandwidth use and reduce transfer costs and more efficiently provide machine-learned models for use in various applications, such as mobile applications. Further, the systems and methods described herein may provide reductions in storage requirements and system resources, thus making machine-learned models more appealing in limited-bandwidth networks.

With reference now to the Figures, example embodiments of the present disclosure will be discussed in further detail.

Example Devices and Systems

Figure 1:
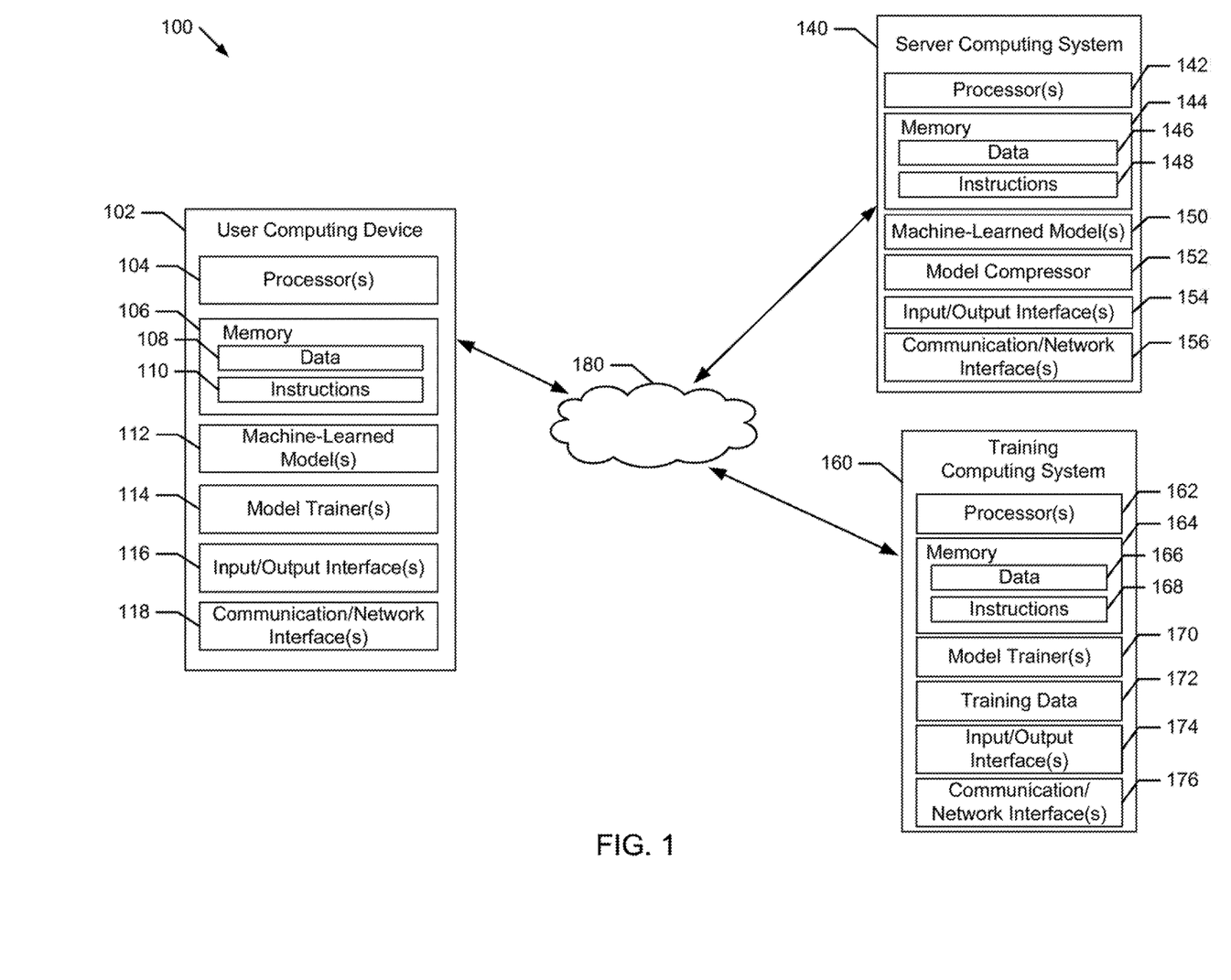
FIG. 1 depicts a block diagram of computing system according to example embodiments of the present disclosure.

FIG. 1 depicts a block diagram of an example computing system 100 that can perform compression and distribution of machine learning models according to example embodiments of the present disclosure. The system 100 includes a user computing device 102, a server computing device 140, and a training computing system 160 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

The user computing device 102 includes one or more processors 104 and a memory 106. The one or more processors 104 can be any suitable processing device (e.g., a processor core, a microprocessor, an ASIC, a FPGA, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the processor 104 to cause the user computing device 102 to perform operations.

Furthermore, according to an aspect of the present disclosure, the user computing device 102 can store or include one or more machine-learned models 112. The machine-learned models 112 can be or can otherwise include one or more neural networks (e.g., deep neural networks); Markov models (e.g., hidden Markov models); classifiers; regression models; support vector machines; Bayesian networks; multi-layer non-linear models; or other types of machine-learned models. Neural networks (e.g., deep neural networks) can be feed-forward neural networks, convolutional neural networks, autoencoders, recurrent neural networks (e.g., long short-term memory neural network, gated recurrent units, etc.) and/or various other types of neural networks.

In some implementations, the one or more machine-learned models 112 can be received from the server computing device 140 over network 180, stored in the user computing device memory 108, and then used or otherwise implemented by the one or more processors 104. In some implementations, the user computing device 102 can implement multiple parallel instances of a single machine-learned model 112.

More particularly, machine-learned model(s) 112 can be implemented to provide assistance in various situations and/or applications. As an example, the machine-learned model(s) 112 can be employed within the context of a mobile application of the user computing device 102, providing benefits and advantages during the execution of such mobile applications. Thus, one or more models 112 can be stored and implemented at the user computing device 102.

The user computing device 102 can also include model trainer(s) 114. The model trainer 114 can train or re-train machine-learned models 112 stored at user computing device 102 using various training or learning techniques, such as, for example, backwards propagation of errors (e.g., truncated backpropagation through time). In particular, the model trainer 114 can train or re-train one or more of the machine-learned models 112 using locally stored data as training data. The model trainer 114 can perform a number of generalization techniques to improve the generalization capability of the models being trained. In some implementations, some information about the trained model's parameters can be delivered by the user computing device 102 back to the server computing device 140.

The user computing device 102 can also include one or more input/output interface(s) 116. One or more input/output interface(s) 116 can include, for example, devices for receiving information from or providing information to a user, such as a display device, touch screen, touch pad, mouse, data entry keys, an audio output device such as one or more speakers, a microphone, haptic feedback device, etc. An input/output interface(s) 116 can be used, for example, by a user to control operation of the user computing device 102.

The user computing device 102 can also include one or more communication/network interface(s) 118 used to communicate with one or more systems or devices, including systems or devices that are remotely located from the user computing device 102. The communication/network interface(s) 118 can include any circuits, components, software, etc. for communicating with one or more networks (e.g., network 180). In some implementations, the communication/network interface(s) 118 can include, for example, one or more of a communications controller, receiver, transceiver, transmitter, port, conductors, software, and/or hardware for communicating data.

The server computing device 140 includes one or more processors 142 and a memory 144. The one or more processors 142 can be any suitable processing device (e.g., a processor core, a microprocessor, an ASIC, a FPGA, a controller, a microcontroller, etc.) and can be one processor or a plurality of processors that are operatively connected. The memory 144 can include one or more non-transitory computer-readable storage mediums, such as RAM, ROM, EEPROM, EPROM, flash memory devices, magnetic disks, etc., and combinations thereof. The memory 144 can store data 146 and instructions 148 which are executed by the processor 142 to cause the server computing device 140 to perform operations.

In some implementations, the server computing device 140 includes or is otherwise implemented by one or more server computing devices. In instances in which the server computing device 140 includes plural server computing devices, such server computing devices can operate according to sequential computing architectures, parallel computing architectures, or some combination thereof.

As described above, the server computing device 140 can store or otherwise include one or more machine-learned models 150. The machine-learned models 150 can be or can otherwise include one or more neural networks (e.g., deep neural networks); Markov models (e.g., hidden Markov models); classifiers; regression models; support vector machines; Bayesian networks; multi-layer non-linear models; or other types of machine-learned models. Neural networks (e.g., deep neural networks) can be feed-forward neural networks, convolutional neural networks, autoencoders, recurrent neural networks (e.g., long short-term memory neural network, gated recurrent units, etc.) and/or various other types of neural networks.

The server computing device 140 can also include a model compressor 152 that can perform compression of one or more machine learning models 150 to reduce the size (e.g., the data storage and transfer requirements) of the machine-learned model(s). In particular, in some implementations, the model compressor 152 can perform quantization of one or more weights of the machine learning models 150 where the quantization error introduced by the quantization can be compensated by later quantization errors.

Additionally, in some implementations, model compressor 152 can also provide for additional techniques for improved distribution, storage, and/or use of machine-learned models. For example, in some implementations, the model compressor 152 can perform or enable one or more of: patching for model updates, distributed learning, training for quantization, training for patching, and/or transfer learning.

The server computing device 140 can also include one or more input/output interface(s) 154. The one or more input/output interface(s) 154 can include, for example, devices for receiving information from or providing information to a user, such as a display device, touch screen, touch pad, mouse, data entry keys, an audio output device such as one or more speakers, a microphone, haptic feedback device, etc. An input/output interface(s) 154 can be used, for example, by a user to control operation of the server computing device 140.

The server computing device 140 can also include one or more communication/network interface(s) 156 used to communicate with one or more systems or devices, including systems or devices that are remotely located from the server computing device 140. The communication/network interface(s) 156 can include any circuits, components, software, etc. for communicating with one or more networks (e.g., network 180). In some implementations, the communication/network interface(s) 156 can include, for example, one or more of a communications controller, receiver, transceiver, transmitter, port, conductors, software, and/or hardware for communicating data.

The server computing device 140 can train the machine-learned models 150 via interaction with the training computing system 160 that is communicatively coupled over the network 180. The training computing system 160 can be separate from the server computing device 140 or can be a portion of the server computing device 140.

The training computing system 160 includes one or more processors 162 and a memory 164. The one or more processors 162 can be any suitable processing device (e.g., a processor core, a microprocessor, an ASIC, a FPGA, a controller, a microcontroller, etc.) and can be one processor or a plurality of processors that are operatively connected. The memory 164 can include one or more non-transitory computer-readable storage mediums, such as RAM, ROM, EEPROM, EPROM, flash memory devices, magnetic disks, etc., and combinations thereof. The memory 164 can store data 166 and instructions 168 which are executed by the processor 162 to cause the training computing system 160 to perform operations. In some implementations, the training computing system 160 includes or is otherwise implemented by one or more server computing devices.

The training computing system 160 can include one or more model trainer (s) 170 that trains the machine-learned models 150 stored at the server computing device 140 using various training or learning techniques, such as, for example, backwards propagation of errors (e.g., truncated backpropagation through time). The model trainer 170 can perform a number of generalization techniques (e.g., weight decays, dropouts, etc.) to improve the generalization capability of the models being trained. In particular, the model trainer 170 can train a machine-learned model 150 based on a set of training data 172. The training data 172 can include centrally collected data or remotely obtained data.

The training computing system 160 can also include one or more input/output interface(s) 174. The one or more input/output interface(s) 174 can include, for example, devices for receiving information from or providing information to a user, such as a display device, touch screen, touch pad, mouse, data entry keys, an audio output device such as one or more speakers, a microphone, haptic feedback device, etc. An input/output interface(s) 174 can be used, for example, by a user to control operation of the training computing system 160.

The training computing system 160 can also include one or more communication/network interface(s) 176 used to communicate with one or more systems or devices, including systems or devices that are remotely located from the training computing system 160. The communication/network interface(s) 176 can include any circuits, components, software, etc. for communicating with one or more networks (e.g., network 180). In some implementations, the communication/network interface(s) 176 can include, for example, one or more of a communications controller, receiver, transceiver, transmitter, port, conductors, software, and/or hardware for communicating data.

Each of model trainer 112 and model trainer 170 can include computer logic utilized to provide desired functionality. Each of model trainer 112 and model trainer 170 can be implemented in hardware, firmware, and/or software controlling a general purpose processor. For example, in some implementations, each of model trainer 112 and model trainer 170 includes program files stored on a storage device, loaded into a memory and executed by one or more processors. In other implementations, each of model trainer 112 and model trainer 170 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well.

Example Methods

Figure 2:
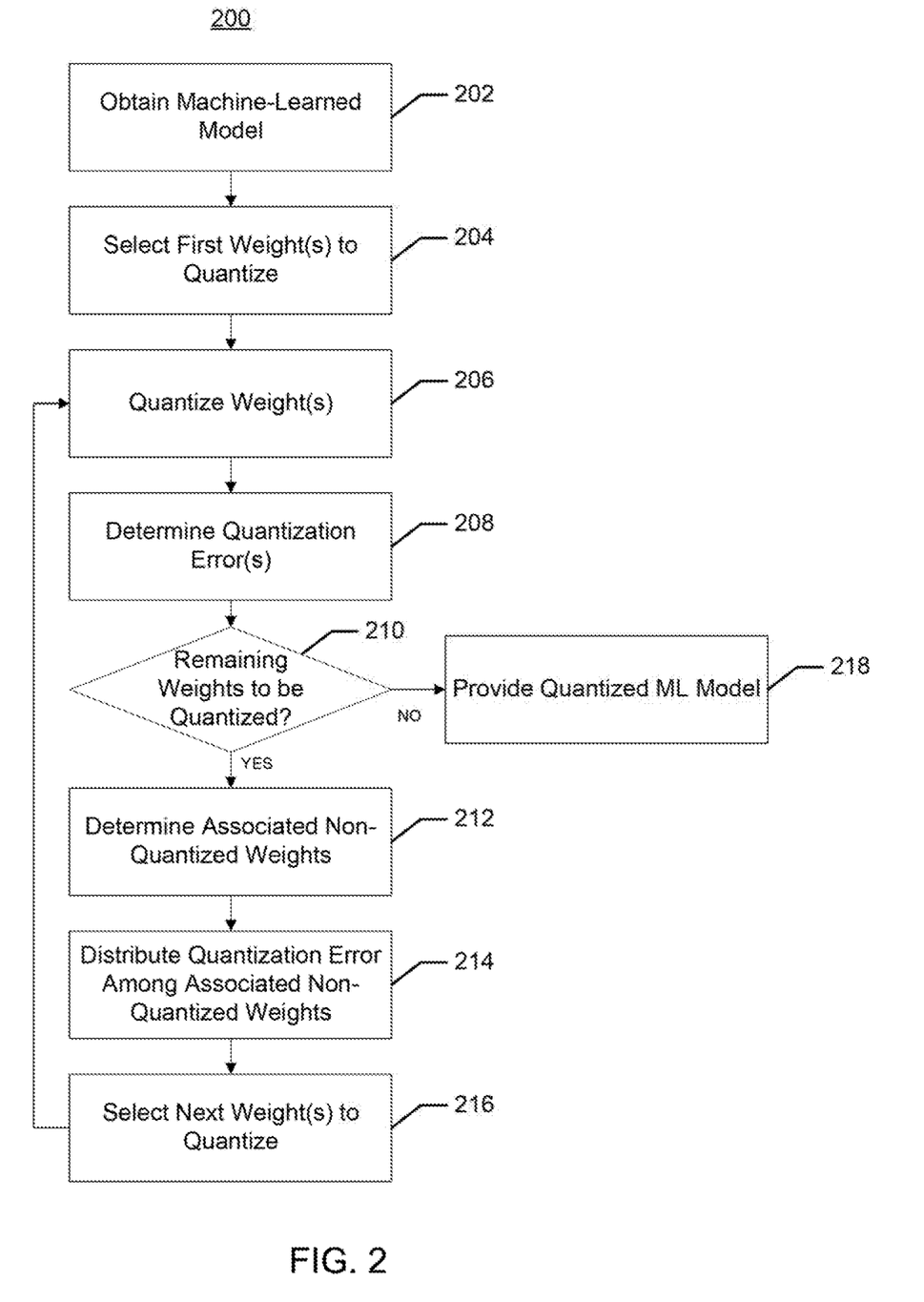
FIG. 2 depicts a flowchart diagram of an example method of model quantization with loss management according to example embodiments of the present disclosure.
Figure 3:
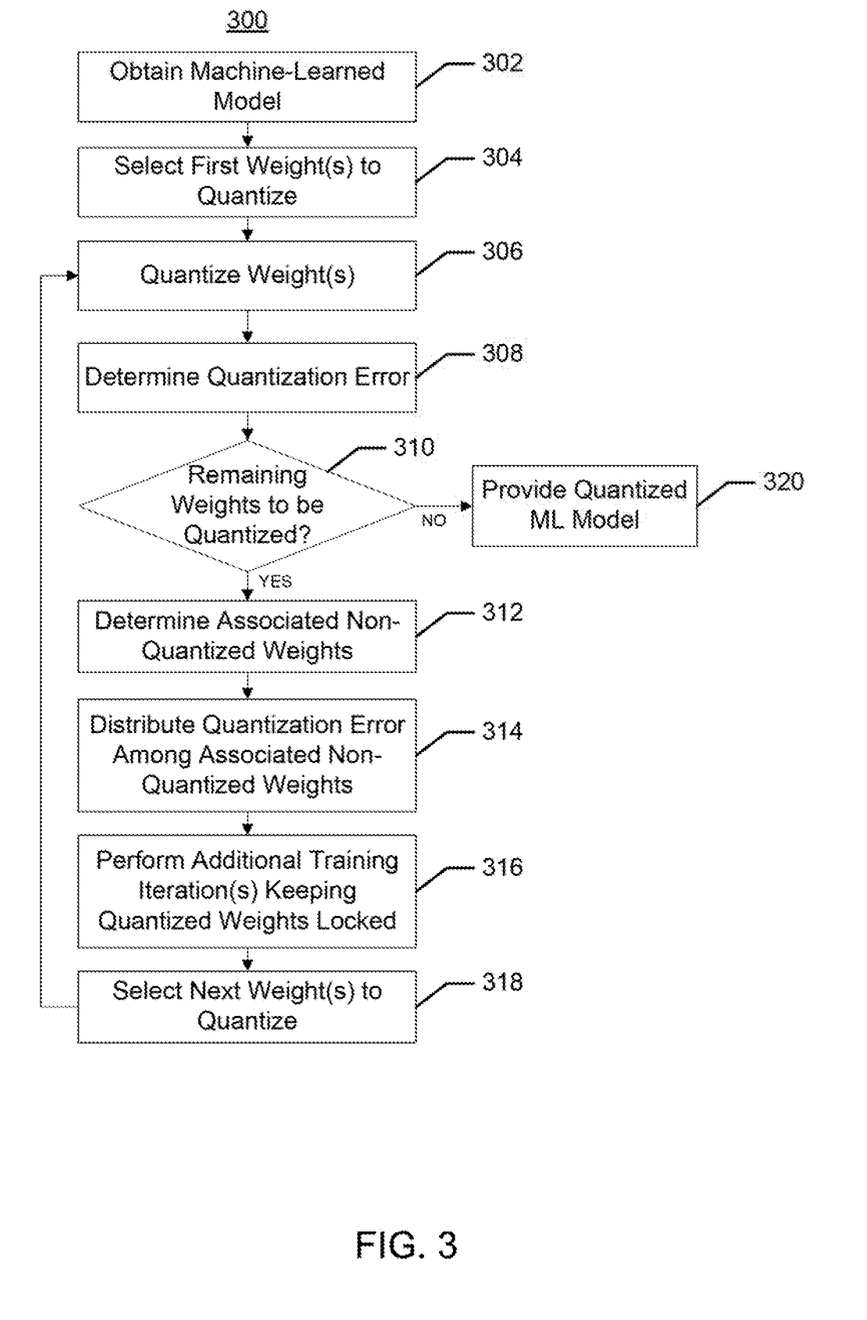
FIG. 3 depicts a flowchart diagram of another example method of model quantization with loss management according to example embodiments of the present disclosure.
Figure 4:
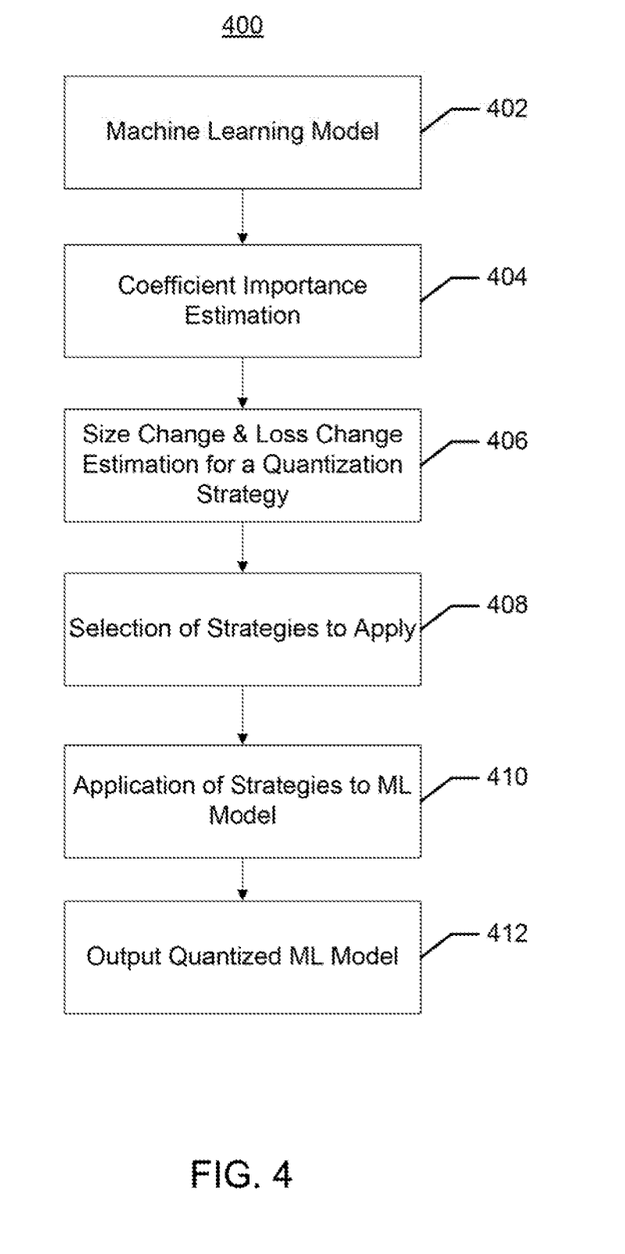
FIG. 4 depicts a flowchart diagram of an example method of model quantization according to example embodiments of the present disclosure.

FIGS. 2-4 illustrate example methods of the present disclosure. Although FIGS. 2-4 respectively depict steps in a particular order for purposes of illustration and discussion, the methods of the present disclosure are not limited to the particularly illustrated order or arrangement. The various steps of the methods of FIGS. 2-4 can be omitted, rearranged, combined, and/or adapted in various ways without deviating from the scope of the present disclosure.

FIG. 2 depicts a flowchart diagram of an example method 200 of compressing machine-learning models via model quantization with loss management according to example embodiments of the present disclosure.

At 202, a computing device, such as server computing device 140 of FIG. 1, can obtain a machine learning model, for example, a machine learning model that is to be compressed for distribution to other computing systems, such as in bandwidth-limited networks.

At 204, the computing device can select one or more weights to be quantized as part of reducing the size of the machine learned model. In particular, in some implementations, the computing device can select the one or more weights based on various determinations. For example, in some implementations, the computing device can select the one or more weights to quantize first based on a best-matching coefficient (e.g., the weight that would result in the least amount of quantization error).

At 206, the computing device can quantize the selected weight(s). In some implementations, sets of best matching weights can be done simultaneously for faster computation, for example, the best matching 10% of weights or the like.

At 208, a quantization error for the weight being quantized can be obtained. In particular, when a neural weight is quantized some amount of quantization error is introduced. This quantization error can be compensated for, at least partially, in the following manner.

At 210, the computing device can determine if there are the remaining weights of the machine learning model that have yet to be quantized. If there are remaining non-quantized weights, the method 200 can continue to 212. If there are no remaining weights to be quantized, the method 200 can continue the 218 and provide the quantized machine learning model for distribution.

At 212, the computing device can determine one or more of the non-quantized weights that are associated with the quantized weight (e.g., the weight being quantized and introducing quantization error). For example, the associated non-quantized weights can be determined from nodes within a same layer, nodes from a previous layer or following layer, within connections of a single node, based on node correlation, and/or according to other schemes.

At 214, the quantization error can be propagated or distributed among one or more of the associated non-quantized weights. In particular, in some implementations, for example, the quantization error can be compensated for by dithering to distribute the quantization error among the other associated weights. In one example, the quantization error can be fractionally distributed to the associated weight(s), for example, by using a predetermined multiplier. The next associated weight(s) then takes its original value plus the transferred quantization error, and that new weight value can then be quantized. In some implementations, as the quantization of the weights continues, the quantization error can accumulate until reaching or exceeding a threshold which can then cause an opposite error to be made and thereby reduce the error in the remaining weight values. According to various implementations, quantization error can be distributed from one model layer to the next layer, among nodes within a layer, within connections of a single node, based on node correlation, and/or according to other schemes, for example.

At 216, the computing device can then select one or more next weights to quantize from among the non-quantized weights, and then return to 206 to iteratively continue the quantization with loss management.

At 218, after completing the quantization iterations of the model weights (e.g., when there are no weights remaining to be quantized at 210), the computing system can provide the quantized machine learning model, for example, to be distributed to other computing devices.

FIG. 3 depicts a flowchart diagram of an example method 300 of compressing machine-learning models via model quantization with loss management according to example embodiments of the present disclosure.

At 302, a computing device, such as server computing device 140 of FIG. 1, can obtain a machine learning model, for example, a machine learning model that is to be compressed for distribution to other computing systems, such as in bandwidth-limited networks.

At 304, the computing device can select one or more weights to be quantized as part of reducing the size of the machine learned model. In particular, in some implementations, the computing device can select the one or more weights based on various determinations. For example, in some implementations, the computing device can select the one or more weights to quantize first based on a best-matching coefficient (e.g., the weight that would result in the least amount of quantization error).

At 306, the computing device can quantize the selected weight(s). In some implementations, sets of best matching weights can be done simultaneously for faster computation, for example, the best matching 10% of weights or the like.

At 308, a quantization error for the weight being quantized can be obtained. In particular, when a neural weight is quantized some amount of quantization error is introduced. This quantization error can be compensated for, at least partially, in the following manner.

At 310, the computing device can determine if there are the remaining weights of the machine learning model that have yet to be quantized. If there are remaining non-quantized weights, the method 300 can continue to 312. If there are no remaining weights to be quantized, the method 300 can continue the 320 and provide the quantized machine learning model for distribution.

At 312, the computing device can determine one or more of the non-quantized weights that are associated with the quantized weight (e.g., the weight being quantized and introducing quantization error). For example, the associated non-quantized weights can be determined from nodes within a same layer, nodes from a previous layer or a following layer, within connections of a single node, based on node correlation, and/or according to other schemes.

At 314, the quantization error can be propagated or distributed among one or more of the associated non-quantized weights. In particular, in some implementations, example, the quantization error can be compensated for by dithering to distribute the quantization error among the other associated weights. In one example, the quantization error can be fractionally distributed to the associated weight(s), for example, by using a predetermined multiplier. The next associated weight(s) then takes its original value plus the transferred quantization error, and that new weight value can then be quantized.

At 316, the computing device can perform one or more additional training iterations for the machine learning model while keeping the quantized weights locked. For example, this locking of weights can allow the first quantization errors to propagate to coefficients that are more difficult to quantize, allowing less overall error to be introduced in the quantization process.

At 318, the computing device can then select one or more next weights to quantize from among the non-quantized weights, and then return to 306 to iteratively continue the quantization with loss management.

At 320, after completing the quantization iterations of the model weights (e.g., when there are no weights remaining to be quantized at 310), the computing system can provide the quantized machine learning model, for example, to be distributed to other computing devices.

FIG. 4 depicts a flowchart diagram of an example method 400 of quantizing machine-learning models according to example embodiments of the present disclosure.

At 402, a computing device, such as server computing device 140 of FIG. 1, can obtain a machine learning model, for example, a machine learning model that is to be compressed for distribution to other computing systems, such as in bandwidth-limited networks.

At 404, the computing device can estimate the importance of one or more coefficients of the machine learning model. For example, the importance of a coefficient can be based at least in part on its magnitude.

At 406, the computing device can estimate the change in size and change in loss for each of the coefficients introduced by one or more quantization strategies. In particular, in some implementations, the quantization strategies can rely on coefficient importance estimation data.

At 408, the computing device can select one or more quantization strategies to be applied to the machine learning model, based at least in part on the size change and loss change estimations.

At 410, the computing device can apply the one or more selected quantization strategies to the machine learning model.

At 412, the computing device can then output the quantized machine learning model, for example, to be distributed to one or more computing systems (e.g., bandwidth-limited systems such as mobile applications, devices, and/or networks).

Figure 5:
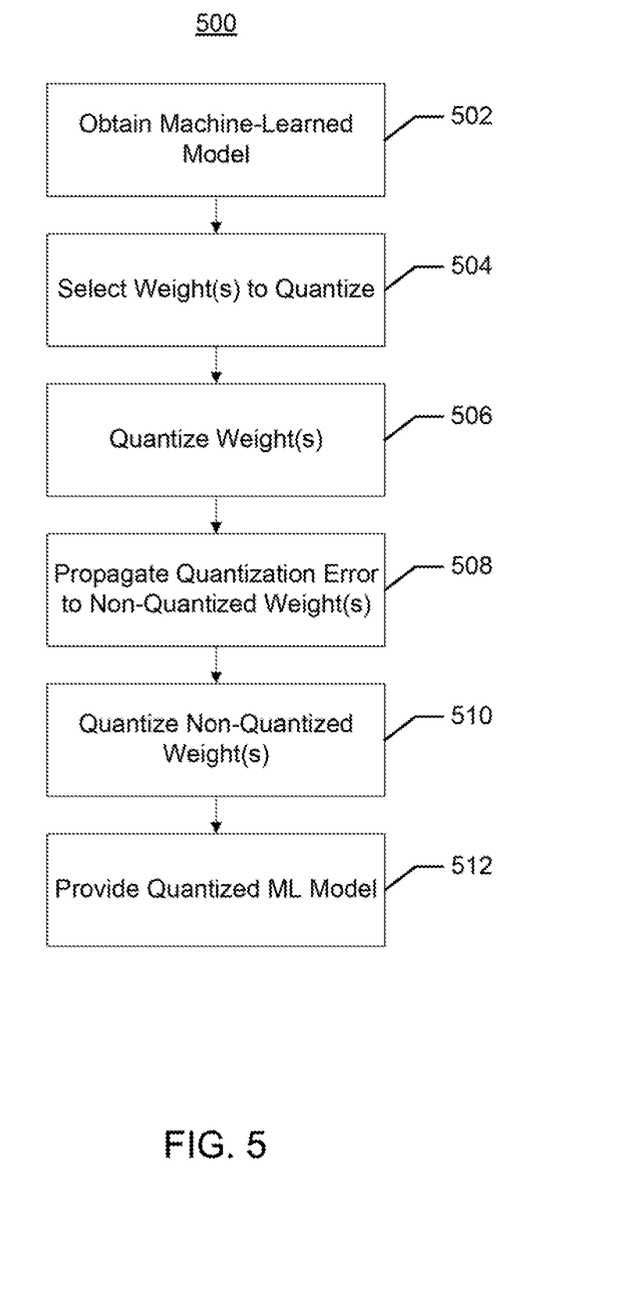
FIG. 5 depicts a flowchart diagram of another example method of model quantization according to example embodiments of the present disclosure.

FIG. 5 depicts a flowchart diagram of an example method 500 of compressing machine-learning models via model quantization with loss management according to example embodiments of the present disclosure.

At 502, a computing device, such as server computing device 140 of FIG. 1, can obtain a machine learning model, for example, a machine learning model that is to be compressed for distribution to other computing systems, such as in bandwidth-limited networks.

At 504, the computing device can select one or more weights to be quantized as part of reducing the size of the machine learned model. In particular, in some implementations, the computing device can select the one or more weights based on various determinations. For example, in some implementations, the computing device can select the one or more weights to quantize first based on a best-matching coefficient (e.g., the weight that would result in the least amount of quantization error).

At 506, the computing device can quantize the selected weight(s). In some implementations, sets of best matching weights can be done simultaneously for faster computation, for example, the best matching 10% of weights or the like.

At 508, the computing device can propagate the quantization error from the quantized weight(s) to one or more non-quantized weights. For example, in some implementations, the quantization error can be compensated for by dithering to distribute the quantization error among other non-quantized weights.

At 510, the computing device can quantize the non-quantized weight(s).

At 512, the computing system can provide the quantized machine learning model, for example, to be distributed to other computing devices.

Additional Disclosure

The technology discussed herein may make reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to compress machine-learned models, the method comprising:
    obtaining, by one or more computing devices, a machine-learned model;
    selecting, by the one or more computing devices, a weight to be quantized;
    quantizing, by the one or more computing devices, the weight;
    propagating, by the one or more computing devices, at least a part of a quantization error to one or more non-quantized weights;
    quantizing, by the one or more computing devices, one or more of the non-quantized weights; and
    providing, by the one or more computing devices, a quantized machine-learned model.

2. The computer-implemented method of claim 1 wherein the step of propagating the quantization error comprises:
    determining, by the one or more computing devices, the quantization error;
    determining, by the one or more computing devices, one or more non-quantized weights associated with the weight; and
    allocating, by the one or more computing devices, a fractional part of the quantization error to each of the associated non-quantized weights.

3. The computer-implemented method of claim 2 wherein the fractional part of the quantization error is allocated to each of the associated non-quantized weights based in part on a predetermined multiplier.

4. The computer-implemented method of claim 2 wherein:
  determining, by the one or more computing devices, the quantization error comprises determining, by the one or more computing devices, the quantization error associated with a first node in a first layer of the machine-learned model; and
  determining, by the one or more computing devices, one or more non-quantized weights associated with the weight comprises identifying a second node in the first layer, wherein the first and second nodes each have a connection to a third node in a second layer.

5. The computer-implemented method of claim 2 wherein allocating, by the one or more computing devices, a fractional part of the quantization error to each of the associated non-quantized weights comprises dithering, by the one or more computing devices, the quantization error within a node of the model.

6. The computer-implemented method of claim 5 further comprising dithering, by the one or more computing devices, the quantization error within a node of the model based in part on a correlation of activity between nodes of the model.

7. The computer-implemented method of claim 6 wherein when there is an inverse correlation of activity between nodes of the model, the quantization error is dithered in an opposite direction.

8. The computer-implemented method of claim 1 wherein the step of propagating the quantization error comprises:
  locking, by the one or more computing devices, the quantized weight; and
  performing, by the one or more computing devices, additional training iterations of the machine-learned model, wherein performing the additional training iterations comprises updating a non-quantized weight.

9. The computer-implemented method of claim 8 further comprising locking, by the one or more computing devices, a number of quantized best matching coefficient weights.

10. The computer-implemented method of claim 1 wherein selecting the weight to be quantized comprises selecting a best matching coefficient.

11. A computing device comprising:
  one or more processors; and
  one or more non-transitory computer-readable media that store instructions that, when executed by the one or more processors, cause the computing device to:
    obtain a machine-learned model;
    select a weight to be quantized;
    quantize the weight;
    propagate at least a part of a quantization error to one or more non-quantized weights;
    quantize one or more of the non-quantized weights; and
    provide a quantized machine-learned model.

12. The computing device of claim 11 wherein propagating the quantization error comprises:
  determining the quantization error;
  determining one or more non-quantized weights associated with the weight; and
  allocating a fractional part of the error to each of the associated non-quantized weights.

13. The computing device of claim 12 wherein the fractional part of the quantization error is allocated to each of the associated non-quantized weights based in part on a predetermined multiplier.

14. The computing device of claim 12 wherein:
  determining the quantization error comprises determining the quantization error associated with a first node in a first layer of the machine-learned model; and
  determining one or more non-quantized weights associated with the weight comprises identifying a second node in the first layer, wherein the first and second nodes each have a connection to a third node in a second layer.

15. The computing device of claim 12 wherein allocating a fractional part of the quantization error to each of the associated non-quantized weights comprises dithering the quantization error within a node of the model.

16. The computing device of claim 15 further comprising dithering the quantization error within a node of the model based in part on a correlation of activity between nodes of the model.

17. The computing device of claim 16 wherein when there is an inverse correlation of activity between nodes of the model, the quantization error is dithered in an opposite direction.

18. The computing device of claim 11 wherein propagating the quantization error comprises:
  locking the quantized weight; and
  performing additional training iterations of the machine-learned model, wherein performing the additional training iterations comprises updating a non-quantized weight.

19. The computing device of claim 18 further comprising locking a number of the quantized best matching coefficient weights.

20. One or more non-transitory computer-readable media that store instructions that, when executed by one or more processors of a computing system, cause the computing system to perform operations, the operations comprising:
  obtaining a machine-learned model;
  for one or more weights of the machine-learned model:
    selecting a weight to be quantized;
    quantizing the weight;
    propagating at least a part of a quantization error to one or more non-quantized weights; and
  providing a quantized machine-learned model.

* * * * *